(No Model.)
W. C. BRAMWELL.
WIND WHEEL.
No. 543,460. Patented July 30, 1895.
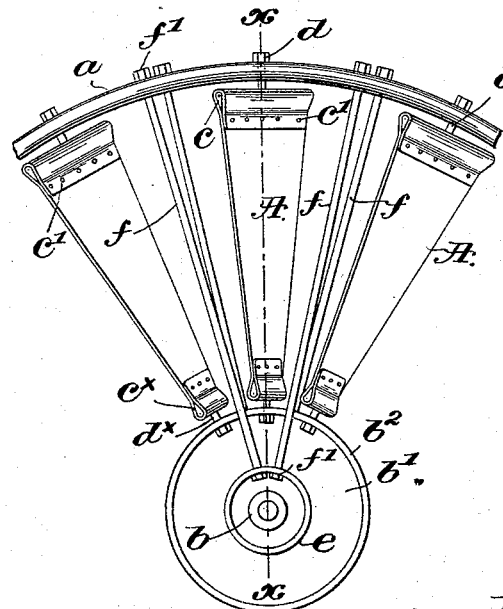
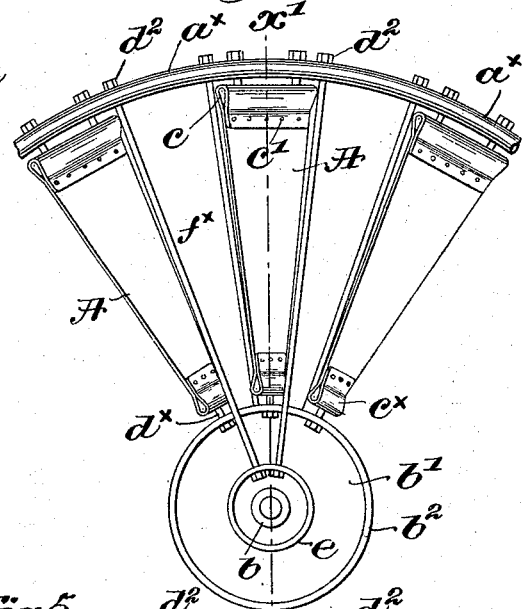
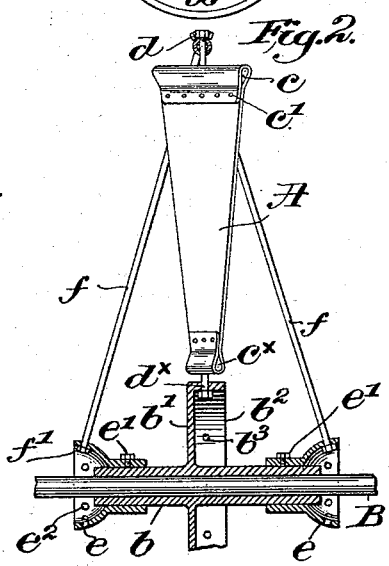
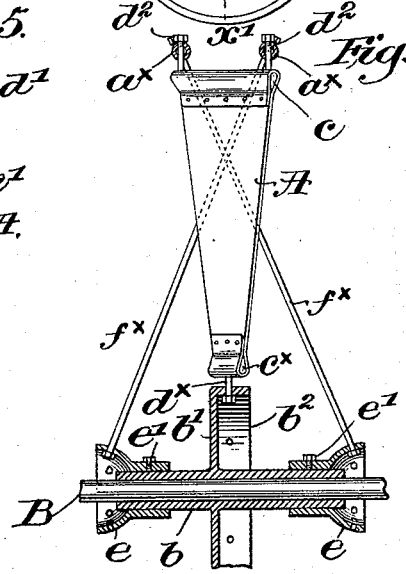
Witnesses.
Fred S. Greenleaf
A. C. Harmon
Inventor:
William C. Bramwell,
by Crosby Gregory. Attys

UNITED STATES PATENT OFFICE.

WILLIAM C. BRAMWELL, OF HYDE PARK, MASSACHUSETTS.

WIND-WHEEL.

SPECIFICATION forming part of Letters Patent No. 543,460, dated July 30, 1895.

Application filed February 19, 1894. Serial No. 500,741. (No model.)

*To all whom it may concern:*

Be it known that I, WILLIAM C. BRAMWELL, of Hyde Park, county of Norfolk, State of Massachusetts, have invented an Improvement in Wind-Wheels, of which the following description, in connection with the accompanying drawings, is a specification, like letters on the drawings representing like parts.

This invention has for its object the construction of a wind-wheel combining great strength with lightness, rigidity, and durability, and the maximum of wind-surface, the wheel being so constructed that the hub and rim are directly connected by the wind-blades under tension, so that the said wind-blades form a necessary structural part of the wheel, thereby doing away entirely with the usual wheel-frame to which the blades have been attached in various ways. By such an arrangement the entire space between the hub and the rim is utilized in presenting surface for the wind to act upon.

My invention accordingly consists in a wind-wheel composed of an elongated hub and a rim, wind-blades under tension directly connecting them, and lateral braces under tension connected to the end of the hub and to the rim, substantially as will be described.

Other features of my invention will be hereinafter more fully described, and particularly pointed out in the claims.

Figure 1 in side elevation represents a sufficient portion of a wind-wheel to be understood as embodying my invention. Fig. 2 is a section thereof on the line $x\ x$, the blade, however, being shown in elevation. Fig. 3 is a side elevation of a modified form of wheel. Fig. 4 is a section thereof on the line $x'\ x'$, the blades being shown in elevation; and Fig. 5 is a sectional detail on a larger scale, to be described.

I have herein shown the wind-wheel as composed of a preferably tubular rim $a$, (see Figs. 1 and 2,) of steel or other strong and light material, and a laterally-extended hub $b$, having at its central portion a disk $b'$ flanged or bent over, as at $b^2$, the said rim and hub being directly connected by a series of members under tension and which are herein shown as the wind-blades A. The said wind-blades are preferably composed of galvanized iron or other thin sheet metal of proper shape, the wider end of the blade which is adjacent the rim being bent over a holder $c$ and riveted or otherwise secured to itself, as at $c'$, the narrow end of the blade being similarly turned over a like holder $c^\times$.

As shown in Figs. 1 and 2, the rim $a$ is provided with a series of holes through which bolts $d$, having threaded shanks $d'$, are extended, the threaded shanks being screwed into suitable openings in the holders $c$, while similar threaded bolts $d^\times$ are passed through openings $b^3$ in the flange of the disk $b'$, and thence into the holders $c^\times$.

The opposite ends of the wind-blades A are set at such an angle with relation one to the other that the face of the blade assumes the correct position to be acted upon by the wind, and when the blades are in place the bolts $d$ and $d^\times$ are tightened to place the blades in tension, whereby they form tension members directly connecting the hub and rim, and form a tension-wheel exactly similar to the well-known bicycle tension-wheel.

It is desirable, and in the larger sizes of wheels necessary, to provide lateral braces against wind-pressure, and thereby obviate any tendency of the wheel to be disturbed; and I have herein shown a cup-shaped brace-support $e$ rigidly secured to each end of the laterally-extended hub $b$ by a suitable bolt, as $e'$, said supports being provided with a series of holes $e^2$, through which are extended the lateral braces $f$, the other ends of the braces passing through diagonal openings in the rim $a$ and being secured in place at either end by suitable nuts $f'$, said lateral braces between the rim and hub being also under tension. The laterally-extended hub forms a broad base for the brace-supports $e$, and the cup-shaped form of the latter renders it very easy to place the braces in position and to adjust the nuts upon the inner ends thereof.

It will be noticed that the entire wheel, including the lateral braces, is supported from the hub, so that the wheel may be removed from its supporting-shaft B or placed thereupon as an entirety, a very important feature, as it greatly simplifies the construction, erection, and repairing of such apparatus.

Referring to Figs. 1 and 2, it will be seen that I have staggered the lateral braces in order to better support and give the necessary strength to the wheel, adjacent braces leading to opposite ends of the hub.

In Figs. 3 and 4 I have shown a slightly-modified construction, wherein two rims $a^\times$ of equal diameter are placed side by side, and the outer end of the wind-blade A is secured to each of said rims by threaded bolts $d^2$, extended through the rims and into the holder $c$. In this construction the holders act also to preserve the proper distance between the rims, and the angle at which the wind-blade is to be turned is also preserved thereby. The extended hub $b$, its flanged disk $b'$, and brace-supports $e$ are the same as hereinbefore described. However, in employing two rims I prefer to arrange the tension-braces as shown in Figs. 3 and 4, wherein one of said braces, as $f^\times$, is shown as connecting the support $e$ at one end of the hub with the rim $a^\times$ nearest the other end of the hub, the next brace connecting the opposite end of the hub with the rim nearest the first-named support, so that the braces cross each other, as clearly shown in Fig. 4. In using a plurality of rims the space between them depends upon the size of the wheel and the width of the wind-blade.

It will be obvious that more than two rims could be used, if desired, without departing from my invention.

If for any reason a blade should become bent or broken, it can be readily removed without necessitating the taking to pieces of the entire wheel, and it may be repaired and replaced or a new one inserted with very little loss of time, and the various parts of the wheel can be maintained at the proper tension without the employment of skilled labor. A wheel so constructed is very strong, of light weight, and is most durable.

My invention is not restricted to the precise construction and arrangement of parts as herein shown, nor to the number of rims employed, nor to the shape and size of the wind-blades, as the same may be altered or modified without departing from the spirit of my invention.

By the term "wind-blades" I mean thin light blades of greater width than thickness adapted to receive the impact of the wind and to thereby turn the wheel.

I claim—

1. A wind wheel, composed of an elongated hub and a rim, wind blades under tension directly connecting them, and lateral braces under tension connected to the end of the hub and to the rim, substantially as described.

2. In a wind wheel, a plurality of rims placed side by side, an elongated hub, a series of wind blades under tension and connected at their outer ends to the rim and at their inner ends to the hub, and lateral wind braces under tension secured to the rims and alternately to opposite ends of the elongated hub, substantially as described.

3. In a wind wheel, a laterally extended hub having a central flanged disk, and a rim, combined with a series of radial wind blades under tension and connected at their inner ends to the flanged disk of the hub, and at their outer ends to the rim, and lateral braces also under tension, between the rim and the extended portions of the hub, substantially as described.

4. In a wind wheel, a laterally extended hub, a rim, and wind blades under tension directly connecting them, combined with a cup-shaped support secured to each end of the hub, and lateral braces under tension secured to said rim and to the cup-shaped support, substantially as described.

In testimony whereof I have signed my name to this specification in the presence of two subscribing witnesses.

WILLIAM C. BRAMWELL.

Witnesses:
GEORGE SANFORD,
CHARLES E. PALMER.